(12) United States Patent
Gutierrez et al.

(10) Patent No.: US 9,332,452 B2
(45) Date of Patent: May 3, 2016

(54) RADIO COMMUNICATION DEVICES AND METHODS FOR CONTROLLING A RADIO COMMUNICATION DEVICE

(71) Applicants:INTEL MOBILE COMMUNICATIONS GMBH, Neubiberg (DE); INTEL CORPORATION, Santa Clara, CA (US)

(72) Inventors: Ismael Gutierrez, Dresden (DE); Yuan Zhu, Beijing (CN)

(73) Assignees: Intel Deutschland GmbH, Neubiberg (DE); Intel Corporation, Santa Clara, CA (US)

( * ) Notice: Subject to any disclaimer, the term of this patent is extended or adjusted under 35 U.S.C. 154(b) by 69 days.

(21) Appl. No.: 13/674,123

(22) Filed: Nov. 12, 2012

(65) Prior Publication Data

US 2013/0324050 A1 Dec. 5, 2013

Related U.S. Application Data

(60) Provisional application No. 61/653,367, filed on May 30, 2012.

(51) Int. Cl.
*H04W 24/10* (2009.01)
*H04L 1/00* (2006.01)
(Continued)

(52) U.S. Cl.
CPC ............. *H04W 24/10* (2013.01); *H04L 1/0023* (2013.01); *H04L 1/0029* (2013.01); *H04L 1/20* (2013.01); *H04W 72/1231* (2013.01)

(58) Field of Classification Search
None
See application file for complete search history.

(56) References Cited

U.S. PATENT DOCUMENTS 8,964,591 B2 2/2015 Kim et al.
2006/0135193 A1 6/2006 Ratasuk et al.
(Continued)

FOREIGN PATENT DOCUMENTS

WO WO 2011/093753 A1 * 8/2011
WO 2012002673 A2 1/2012

OTHER PUBLICATIONS

Office Action received from CN application 2013102092732, mailed on Dec. 9, 2014, 21 pages with 14 pages Englisch translation thereof (for reference purpose only).
(Continued)

*Primary Examiner* — Ping Hsieh
*Assistant Examiner* — James Yang (57) ABSTRACT

A radio communication device may be provided. The radio communication device may include: a measurement circuit configured to measure a first reception quality of a first signal from another radio communication device and configured to measure a second reception quality of a second signal from the other radio communication device; a transmitter configured to transmit information related to the measured first reception quality to the other radio communication device; a memory configured to store information related to the transmitted information; a comparison circuit configured to compare information related to the measured second reception quality with the stored information; a determiner configured to determine a quality of the previously transmitted information based on the comparison by the comparison circuit; and the transmitter further configured to transmit to the other radio communication device information indicating the determined quality of the previously transmitted information.

14 Claims, 9 Drawing Sheets

(51) Int. Cl.
*H04L 1/20* (2006.01)
*H04W 72/12* (2009.01)

(56) References Cited

U.S. PATENT DOCUMENTS

| | | | |
|---|---|---|---|
| 2009/0060010 A1* | 3/2009 | Maheshwari et al. | 375/211 |
| 2009/0109909 A1* | 4/2009 | Onggosanusi et al. | 370/329 |
| 2009/0130986 A1* | 5/2009 | Yun et al. | 455/67.11 |
| 2010/0110982 A1* | 5/2010 | Roh et al. | 370/328 |
| 2010/0113028 A1 | 5/2010 | Simonsson et al. | |
| 2010/0159921 A1 | 6/2010 | Choi et al. | |
| 2012/0250541 A1* | 10/2012 | Ko et al. | 370/252 |
| 2012/0300661 A1* | 11/2012 | Asplund et al. | 370/252 |
| 2013/0163461 A1 | 6/2013 | Kim et al. | |

OTHER PUBLICATIONS

Office Action received for the corresponding German patent application No. DE 10 2013 105 588.5, mailed Aug. 4, 2015, 12 pages, including 5 pages of English translation.

* cited by examiner

RADIO COMMUNICATION DEVICES AND METHODS FOR CONTROLLING A RADIO COMMUNICATION DEVICE

CROSS-REFERENCE TO RELATED APPLICATIONS

The present application claims the benefit of the U.S. patent application No. 61/653,367 filed on 30 May 2012, the entire contents of which are incorporated herein by reference for all purposes.

TECHNICAL FIELD

Aspects of this disclosure relate generally to radio communication devices and methods for controlling a radio communication device.

BACKGROUND

A radio communication terminal may measure a reception quality from a base station and may report measurement results to the base station. The bandwidth for transmitting the information may be limited. Thus, there may be a need for efficient transmission of information related to the measurements.

SUMMARY

A radio communication device may include: a measurement circuit configured to measure a first reception quality of a first signal from another radio communication device and configured to measure a second reception quality of a second signal from the other radio communication device; a transmitter configured to transmit information related to the measured first reception quality to the other radio communication device; a memory configured to store information related to the transmitted information; a comparison circuit configured to compare information related to the measured second reception quality with the stored information; a determiner configured to determine a quality of the previously transmitted information based on the comparison by the comparison circuit; and the transmitter further configured to transmit to the other radio communication device information indicating the determined quality of the previously transmitted information.

A radio communication device may include: a receiver configured to receive from another radio communication device first information related to a measured first reception quality of a signal from the radio communication device to the other radio communication device and configured to receive from the other radio communication device second information indicating a quality of the first information; and a determiner configured to determine whether to use the first information based on the second information.

A method for controlling a radio communication device may include: measuring a first reception quality of a first signal from another radio communication device and measuring a second reception quality of a second signal from the other radio communication device; transmitting information related to the measured first reception quality to the other radio communication device; storing information related to the transmitted information; comparing information related to the measured second reception quality with the stored information; determining a quality of the previously transmitted information based on the comparison by the comparison circuit; and transmitting to the other radio communication device information indicating the determined quality of the previously transmitted information.

A method for controlling a radio communication device may include: receiving from another radio communication device first information related to a measured first reception quality of a signal from the radio communication device to the other radio communication device and receiving from the other radio communication device second information indicating a quality of the first information; and determining whether to use the first information based on the second information.

A radio communication device may include: a measurement circuit configured to measure a first reception quality of a first signal from another radio communication device and configured to measure a second reception quality of a second signal from the other radio communication device; and a transmitter configured to transmit information related to the measured first reception quality to the other radio communication device and configured to transmit to the other radio communication device information indicating a quality of the transmitted information, the quality determined based on a comparison of information related to the measured second reception quality with the information related to the transmitted information.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which.

DESCRIPTION

The following detailed description refers to the accompanying drawings that show, by way of illustration, specific details and aspects of the disclosure in which the invention may be practiced. These aspects of the disclosure are described in sufficient detail to enable those skilled in the art to practice the invention. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The term "protocol" is intended to include any piece of software, that is provided to implement part of any layer of the communication definition.

A radio communication device may be an end-user mobile device (MD). A radio communication device may be any kind of mobile radio communication terminal, for example any kind of mobile radio communication device, mobile telephone, personal digital assistant, mobile computer, or any other mobile device configured for communication with another radio communication device, a mobile communication base station (BS) or an access point (AP) and may be also referred to as a User Equipment (UE), a mobile station (MS) or an advanced mobile station (advanced MS, AMS), for example in accordance with IEEE 802.16m.

A radio communication device may be a radio base station. A radio base station may be a radio base station operated by a network operator (which may also be referred to as a legacy base station), e.g. a NodeB or an eNodeB (eNB), or may be a home base station, e.g. a Home NodeB, e.g. a Home (e)NodeB. In an example, a 'Home NodeB' may be understood in accordance with 3GPP (Third Generation Partnership Project) as a trimmed-down version of a cellular mobile radio base station optimized for use in residential or corporate environments (e.g., private homes, public restaurants or small office areas). Femto-Cell Base Stations (FC-BS) may be provided in accordance with a 3GPP standard, but may also be provided for any other mobile radio communication standard, for example for IEEE 802.16m.

The radio communication device may include a memory which may for example be used in the processing carried out by the radio communication device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

A radio communication terminal may measure a reception quality from a base station and may report measurement results to the base station. The bandwidth for transmitting the information may be limited. Thus, there may be a need for efficient transmission of information related to the measurements.

Figure 1:
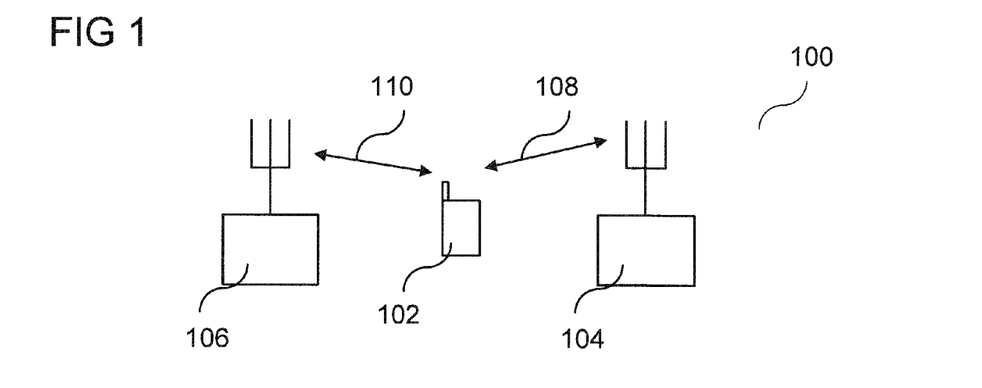
FIG. 1 shows a mobile radio communication system.

FIG. 1 shows a mobile radio communication system 100. A first radio communication device 102 (for example a mobile radio communication terminal) may receive a signal from a second radio communication device (for example a first base station) 104, for example wirelessly like indicated by means of a first arrow 108. The first radio communication device 102 may further receive a signal from a third radio communication device (for example a second base station) 106, for example wirelessly like indicated by means of a second arrow 110. The radio communication device 102 may perform measurements, for example (power) measurements of signals received from the first radio base station 104 and of signals received from the second radio base station 106.

Devices and methods may be provided for MIMO (multiple input, multiple output) and CSI (channel state information) feedback. Devices and methods may be provided for periodic UE selected Subband CSI.

Periodic UE Selected subband CSI may be provided for transmissions where precoding information is not reported (PUCCH 2-0) and for transmissions where the precoding is determined based on the received reports (PUCCH 2-1).

Periodic UE Selected Subband CSI is e.g. defined in LTE (Long Term Evolution) Rel. (Release) 8 for single transmit antennas, as well as 2Tx and 4Tx. In LTE-A Rel. 10, this mode may be extended to support 8Tx (transmitter) beamforming. The subband CSI may become increasingly important in LTE networks in order to fully reap the gain of subband scheduling/beamforming, e.g. when multi-user MIMO (multiple input multiple output) or enhanced downlink control channel is deployed. In various embodiments, when the periodic UE Selected Subband CSI is implemented or scheduled by the eNodeB, the order of the reporting of the respective measurement results on the RI, WB PMI/CQI and SBs is predefined and thus fixed. Furthermore, the time interval between the transmission of the respective measurement reports may be signaled to the UE by the eNodeB and thus illustratively controlled by the eNodeB.

Figure 2:
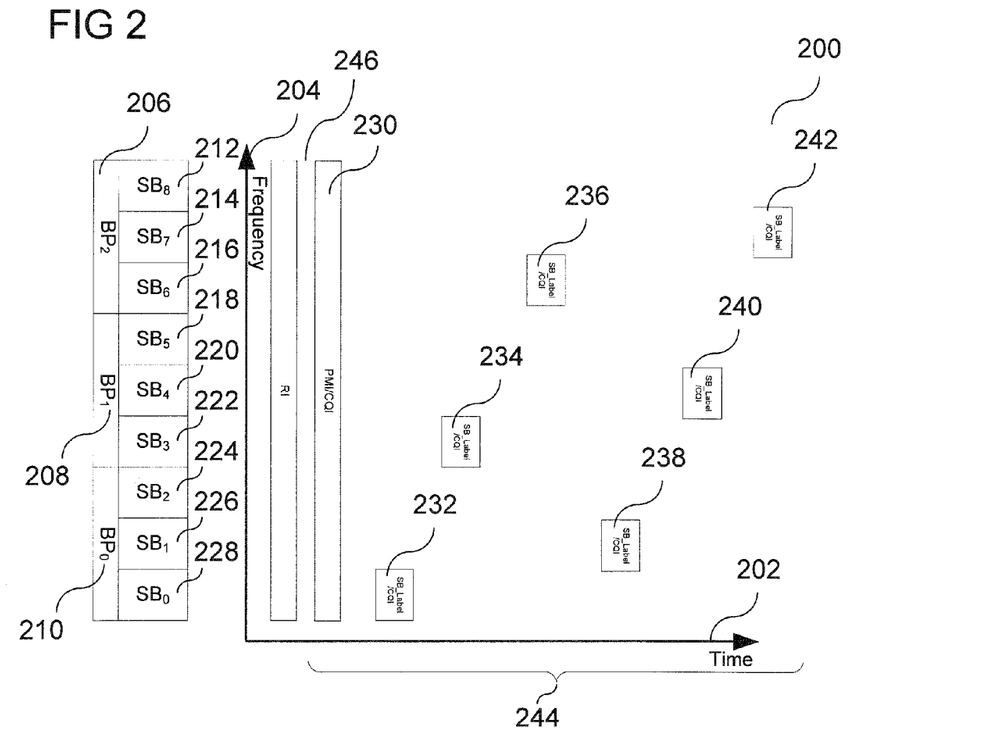
FIG. 2 shows a reporting timing.

The reporting principle of PUCCH 2-1 is illustrated in FIG. 2.

FIG. 2 shows a diagram 200 illustrating a PUCCH 2-1 CSI reporting timing. In this example, physical resource blocks (PRBs, for example 50 PRBs) of one system, for example of one 10 MHz system, may be firstly be organized into an integer number, for example nine, of subbands (SBs; for example a zero-th subband $SB_0$ 228, a first subband SB1 226, a second subband SB2 224, a third subband SB$_3$ 222, a fourth subband SB$_4$ 220, a fifth subband SB$_5$ 218, a sixth subband SB$_6$ 216, a seventh subband SB$_7$ 214, and an eighth subband SB$_8$ 212) and each SB may include or may consist of 6 contiguous PRBs except for the last SB which may only contain two PRBs. It should be noted that various embodiments may be provided using an arbitrary number of contiguous and/or non-contiguous subbands. The nine SB may further be organized as three (or more generally an integer number J) bandparts (BPs, for example a zero-th bandpart BP$_0$, a first bandpart BP$_1$ 208, and a second bandpart BP$_2$ 206) and each BP may include or may consist of contiguous subbands, for example of three contiguous subbands. Exemplary timing of reporting is shown as boxes in a diagram wherein a horizontal axis 202 shows time and a vertical axis 204 shows frequency. A UE may use J*K+1 CSI reports (like indicated by bracket 244) to scan the full system bands with K (K>0) cycles. A first report 230 within one scanning cycle may start with wideband (WB) PMI (precoding matrix index)/CQI (channel quality indicator). In each subband scanning cycle, the UE may scan each BP sequentially. In each SB report (for example in a first SB report 232, a second SB report 234, a third SB report 236, a fourth SB report 238, a fifth SB report 240, and a sixth SB report 242), the UE may recommend the best SB in the BP and may report its (for example of the SB or of the BP) CQI accordingly. It may be seen that for a given BP, the CSI update interval may increase to J+1/K reports. On the other hand, SB CSI may be less stable compared with WB CSI for the same Doppler speed. This may cause that some of the SB CSIs are outdated but still used at eNB scheduler.

A UE/eNB implementation of PUCCH 2-1 may be as follows.

A UE behavior using PUCCH 2-1 may be as follows.

When reporting the WB PMI/CQI, the UE may calculate the so called RI (rank indicator) and WB PMI/CQI using the whole system band. It is to be noted that the RI and the WB PMI/CQI may be reported at different times (e.g. using different subframes, as indicated by means of a transmission time gap 246 in FIG. 2). When an RI report is transmitted, the WB PMI/CQI report may be dropped, if they are reported simultaneously, e.g. in the same subframe.

When reporting the SB label, SB CQI, the UE may calculate the SB label (by way of example, the UE may determine the SB for which the channel conditions are more favorable, and thus, the CQI reported may be higher), wherein the UE may condition the SB CQI on the WB RI/PMI using the SBs in the j$^{th}$ band part (for example may take the SBs in the j$^{th}$ band part into account when calculating the SB label) (by way of example, the UE may determine the SB for which the channel conditions are more favorable, and thus, the CQI reported may be higher).

An eNB behavior using PUCCH 2-1 may be as follows:

The eNB may keep the most recent RI and WB PMI/CQI. For example, as a first alternative, the eNB may discard all J SB reports if RI or PMI changes. For example, as a second alternative, the eNB may discard all J SB reports after receiving WB PMI/CQI. The first alternative may be better in low speed, and the second alternative may be robust to mobility.

The eNB may keep the most recent J SB reports (wherein the previous SB reports may be outdated).

When eNB derives SB CQI in order to perform SB scheduling, the eNB may use the SB report if UE recommended this SB in the most recent J SB reports; otherwise, the eNB may use the WB report.

Similar methods and devices may be provided for PMI-less BP scanning CSI reporting mode such as PUCCH 2-0.

Figure 3:
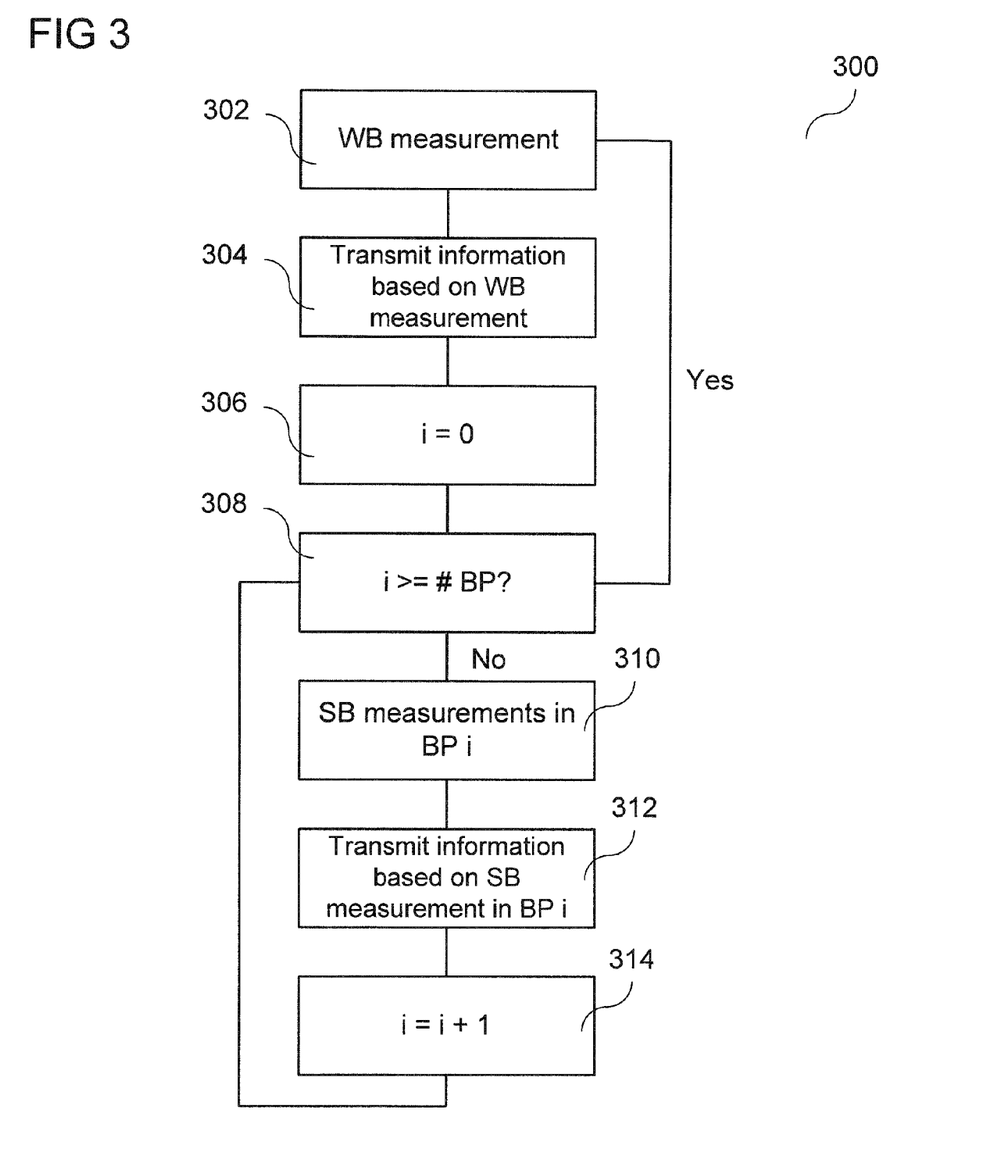
FIG. 3 shows a flow diagram of a method leading to the reporting timing of FIG. 2.

FIG. 3 shows a flow diagram 300 of a method leading to the reporting timing of FIG. 2 carried out by a mobile radio communication terminal. In 302, the mobile radio communication terminal may perform a WB measurement. In 304, the mobile radio communication terminal may transmit information based on the WB measurement (in other words: the mobile radio communication terminal may perform WB reporting). In 306, the mobile radio communication terminal may set i to zero (0). In 308, the mobile radio communication terminal may check whether i is greater or equal to the number of BPs. If yes, the mobile radio communication terminal may proceed with processing in 302. If no, the mobile radio communication terminal may proceed with processing in 310. In 310, the mobile radio communication terminal may perform SB measurements in BP$_i$. In 312, the mobile radio communication terminal may transmit information based on the SB measurements in BP$_i$ (in other words, the mobile radio communication terminal may perform SB reporting). In 314, the mobile radio communication terminal may increase the value of i by e.g. one (1).

For 2/4Tx, the SB CSI report payload may still have room to carry at least two more bits, like illustrated in Table 1. These two bits may be utilized to improve the subband CSI. For periodic PUCCH 2-0, SB CQI may use four bits, and label may use one to two bits, so in total five to six bits are available for additional signaling purposes.

TABLE 1

Payload for PUCCH 2-0 and 2-1

| Rank | 2 Tx | | 4 Tx | |
|---|---|---|---|---|
| | v = 1 | v = 2 | v = 1 | v = 2 |
| SB CQI | 4 | 4 | 4 | 4 |
| Spatial differential CQI | 0 | 3 | 0 | 3 |
| sb-label | 1-2 | 1-2 | 1-2 | 1-2 |
| Sum of bits | 5-6 | 8-9 | 5-6 | 8-9 |
| Space for additional bits | 6-5 | 3-2 | 6-5 | 3-2 |

Figure 4:
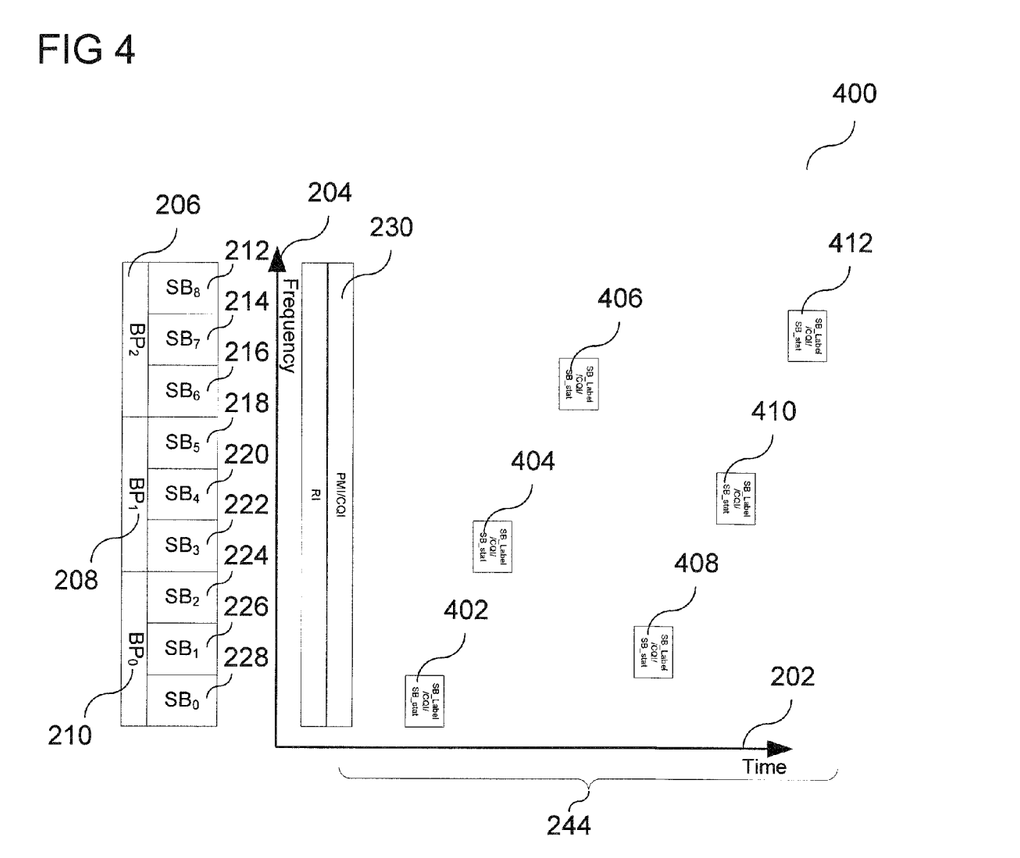
FIG. 4 shows a reporting timing with additional information based on a comparison.

When J=3, one way is to utilize two of these bits to indicate whether the previous J−1 SB reports are still valid or not. When the UE is reporting SB CSI for BP 2, it may utilize the two bits to indicate whether the SB CSI reports for BP 0/1 are still valid. These two bits may be referred to as "SB_stat". FIG. 4 illustrates this.

FIG. 4 shows a diagram 400 illustrating to utilize the 2 bits in SB CSI to indicate whether the previous J−1 SB CSI reports are still valid according to a first option (option 1, implicit signaling), as will be described further below. PRBs may be grouped into BPs and SBs, as described above with reference to FIG. 2, and the same reference signs as used in FIG. 2 may be used in FIG. 4. Furthermore, the same reference signs for the axes and number of blocks used in FIG. 2 may be used for FIG. 4.

In each SB report (for example in a first SB report 402, a second SB report 404, a third SB report 406, a fourth SB report 408, a fifth SB report 410, and a sixth SB report 412), the UE may utilize the two bits (SB_stat) to indicate whether the SB CSI reports of the BP currently not reported are still valid.

In the example shown in FIG. 4, where J=3, by using these two extra bits, the reporting interval may be reduced from original J+1/K to 1+1/(J*K), which may translate into better channel tracking capabilities and therefore, higher throughput.

In another example, if the number of PRB is larger than 50, and therefore, J=4, the two-three bits may be used to signal the status of previously 2-3 reported BP. In an alternative implementation, only the status of the 3 first BP may be signaled.

In yet an alternative implementation, each status bits may be used to signal the status of more than one BP.

Both eNB/UE may provide processing for the enhanced PUCCH 2-1.

The UE behavior using enhanced PUCCH 2-1 (which may also be referred to as option 1) may be as follows.

When reporting the WB PMI/CQI, the UE may calculate RI and WB PMI/CQI using the whole system band. It is to be noted that the RI and the WB PMI/CQI may be reported at different times (e.g. using different subframes, as indicated by transmission time gap 246 in FIG. 2). When an RI report is transmitted, the WB PMI/CQI report may be dropped, if they are reported simultaneously, e.g. in the same subframe.

When reporting the SB label, SB CQI, a) the UE may calculate the SB label, SB CQI conditioned on the WB RI/PMI using the SBs in the j$^{th}$ band part; and b) the UE may calculate the SB CQI conditioned on the WB RI/PMI, SB label, for all the other BPs. For example, as a first alternative, the UE may compare the SB CQI with the WB CQI; if WB CQI is closer (for example closer than the previously reported SB SQI) to the calculated SB CQI for this BP, the UE may set an invalidate bit to 1, and otherwise may set the invalidate bit to 0. For example, as a second alternative, the UE may compare the SB CQI with the reported SB CQI; if SB CQI is lower than the reported SB CQI, the UE may set the invalidate bit to "1"; and otherwise the UE may set the invalidate bit to "0". Furthermore, for example, the UE may set the invalidate bit to "1" if the UE recommends an SB in the BP different from the previously recommended SB.

An eNB behavior using enhanced PUCCH 2-1 (which may be referred to as option 1) may be as follows.

The eNB may keep the most recent RI and WB PMI/CQI. In a first alternative, the eNB may discard all J SB reports if RI or PMI changes. In a second alternative, the eNB may discard all J SB reports after receiving WB PMI/CQI. The first alternative may be better in low speed, and the second alternative may be more robust to mobility.

The eNB may keep the most recent J subband reports, and previous SB reports may be outdated.

When the eNB derives SB CQI in order to perform SB scheduling, the eNB may use the SB report if UE recommends this SB in the most recent J subband reports and this SB is not invalidated by most recent J-1 SB reports. Otherwise, the eNB may use the WB report.

In another example, the eNB may derive the SB CQI in a subband by interpolating the available SB CQI adjacent subbands.

In another example, the UE may use these two bits (SB_stat) to indicate which BP needs to be updated from the second cycle of BP scanning (explicit signaling). This method is illustrated in FIG. 5.

Figure 5:
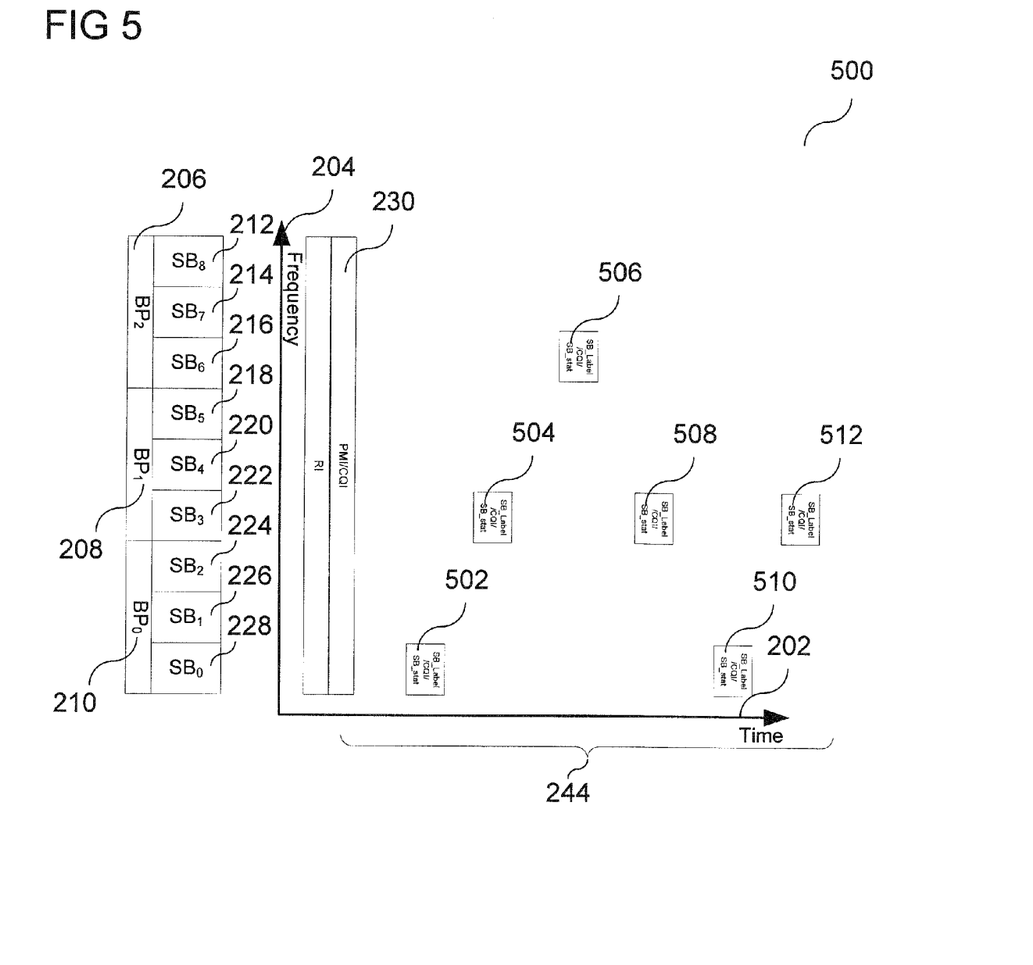
FIG. 5 shows a reporting timing with additional information based on a comparison and with non-periodic reporting.

FIG. 5 shows a diagram 500 illustrating using two bits to indicate which BP needs to be updated from the second scanning (which may be referred to as option 2). PRBs may be grouped into BPs and SBs, as described above with reference to FIG. 2, and the same reference signs as used in FIG. 2 may be used in FIG. 5. Furthermore, the same reference signs for the axes and number of blocks used in FIG. 2 may be used for FIG. 5.

In each SB report (for example in a first SB report 502, a second SB report 504, a third SB report 506, a fourth SB report 508, a fifth SB report 510, and a sixth SB report 512), the UE may utilize the 2 bits to indicate which BP needs to be updated from the second cycle of BP scanning.

Both eNB/UE may provide processing for the enhanced PUCCH 2-1.

A UE behavior using enhanced PUCCH 2-1 (which may be referred to as option 2) may be as follows.

When reporting the WB PMI/CQI, the UE may calculate RI and WB PMI/CQI using the whole system band.

When reporting the SB label, SB CQI (the first scanning), the UE may calculate the SB label, SB CQI conditioned on the WB RI/PMI using the SBs in the j$^{th}$ band part.

When reporting the SB label, SB CQI, BP label (from the second scanning), the UE may compare the SB CQI with the reported SB CQI for all BP and select one BP which has the largest delta (in other words: difference or deviation) and updates this BP. Since the PUCCH is not acknowledged, the UE may assume the report is received correctly.

An eNB behavior using enhanced PUCCH 2-1 (which may be referred to as option 2) may be as follows.

The eNB may keep the most recent RI and WB PMI/CQI. In a first alternative, the eNB may discard all J SB reports if RI or PMI changes. In a second alternative, the eNB may discard all J SB reports after receiving WB PMI/CQI. The first alternative may be better in low speed, and the second alternative may be more robust to mobility.

The eNB may keep J subband reports.

When the eNB derives SB CSI in order to perform SB scheduling, the eNB may use the SB report if the UE recommends this SB for this BP (which may be understood that at the last SB CQI for this BP, the respective SB has been recommended). Otherwise, the eNB may use the WB report.

The PUCCH 2-1 enhancement options like described above may also be applied to enhance the PMI-less CSI reporting mode PUCCH 2-0.

Figure 6:
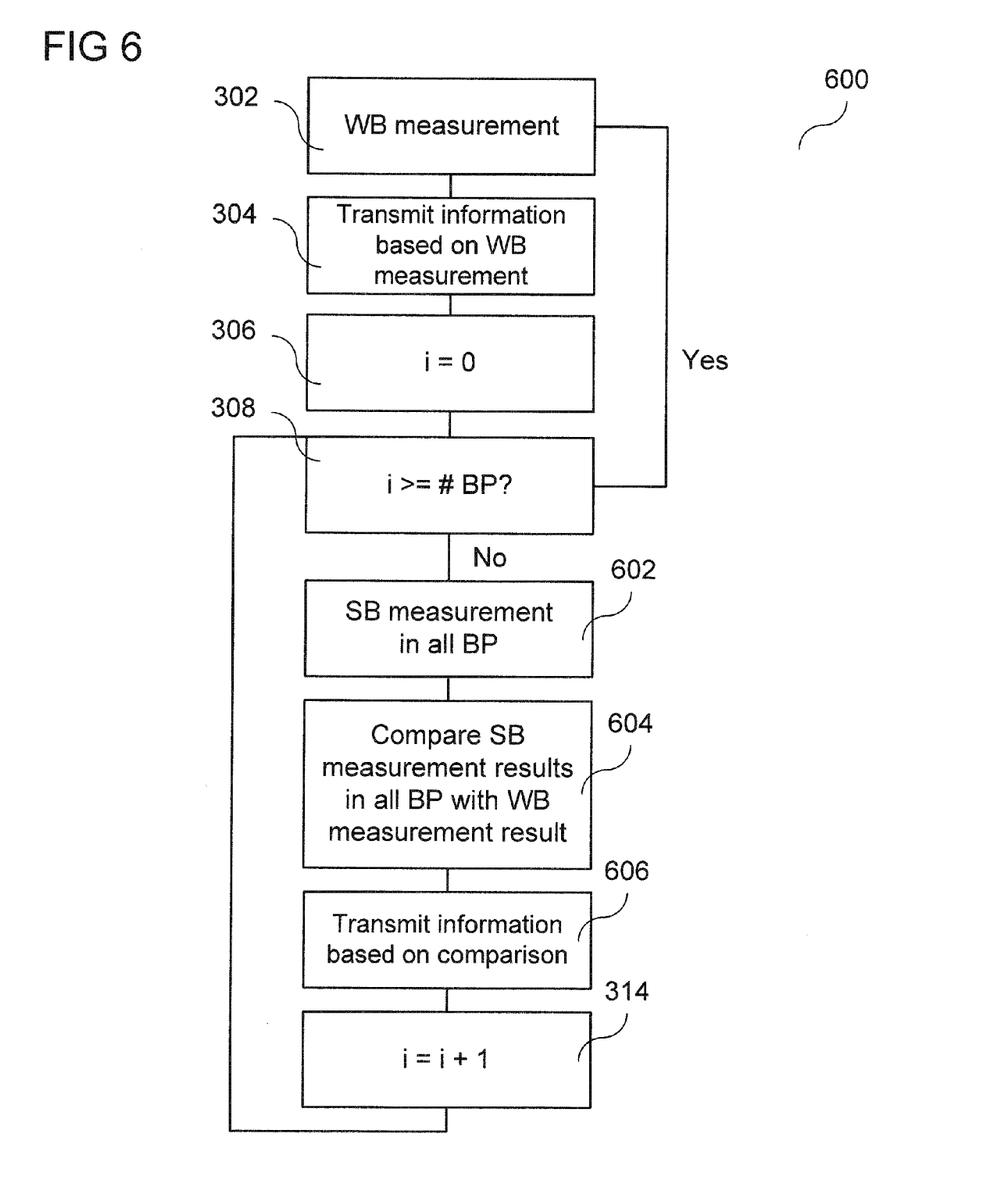
FIG. 6 shows a reporting timing with additional information based on a comparison.

FIG. 6 shows a flow diagram 600 of a method leading to the reporting timing of FIG. 4 or FIG. 5 carried out by a mobile radio communication terminal. Steps shown in FIG. 6 may be identical or similar to steps of the flow illustrated in FIG. 3, and the same reference signs may be used for these steps. The UE may perform SB measurements in all BPs in 602, if the UE determines in 308 the i is not greater or equal to the number of BPs. In 604, the UE may compare the SB measurement results in all BP with the WB measurement result (and/or with previous SB measurement results; and/or with previously reported SB measurement results). In 606, the UE may transmit information based on the comparison.

The performance benefits of both options may be tested using system level simulations. The eNB may be mounted with 4 Tx uniform linear array and the UE may be mounted with 2 Rx (receiver) uniform linear array. And MU (multi user)-MIMO may be employed at eNB with maximum two UEs per PRBs and each UE has 1 layer. 3 km/h UE speed may be simulated. It may be seen that both options have throughput gain at both cell average and cell edge for most test cases. The cell edge gain may be as high as 17%, as may be seen in Table 2.

TABLE 2

System level simulation results for PUCCH 2-1 and two above-described options of its enhancement.

| | Throughput Reference Point | K = 2 | K = 3 | K = 4 |
|---|---|---|---|---|
| PUCCH 2-1 | 5% (bps/Hz) | 0.057 (100%) | 0.063 (100%) | 0.063 (100%) |
| | Cell Avg (bps/Hz) | 2.06 (100%) | 2.07 (100%) | 2.05 (100%) |
| PUCCH 2-1 enhancement, option 1, UE Alt. 1 | 5% (bps/Hz) | 0.067 (117%) | 0.065 (103%) | 0.062 (97.8%) |
| | Cell Avg (bps/Hz) | 2.09 (101%) | 2.07 (99.9%) | 2.07 (101%) |
| PUCCH 2-1 enhancement, option 1, UE Alt. 2 | 5% (bps/Hz) | 0.065 (114%) | 0.062 (98.4%) | 0.06 (95.2%) |
| | Cell Avg (bps/Hz) | 2.11 (102%) | 2.08 (100%) | 2.04 (99.5%) |

Figure 7:
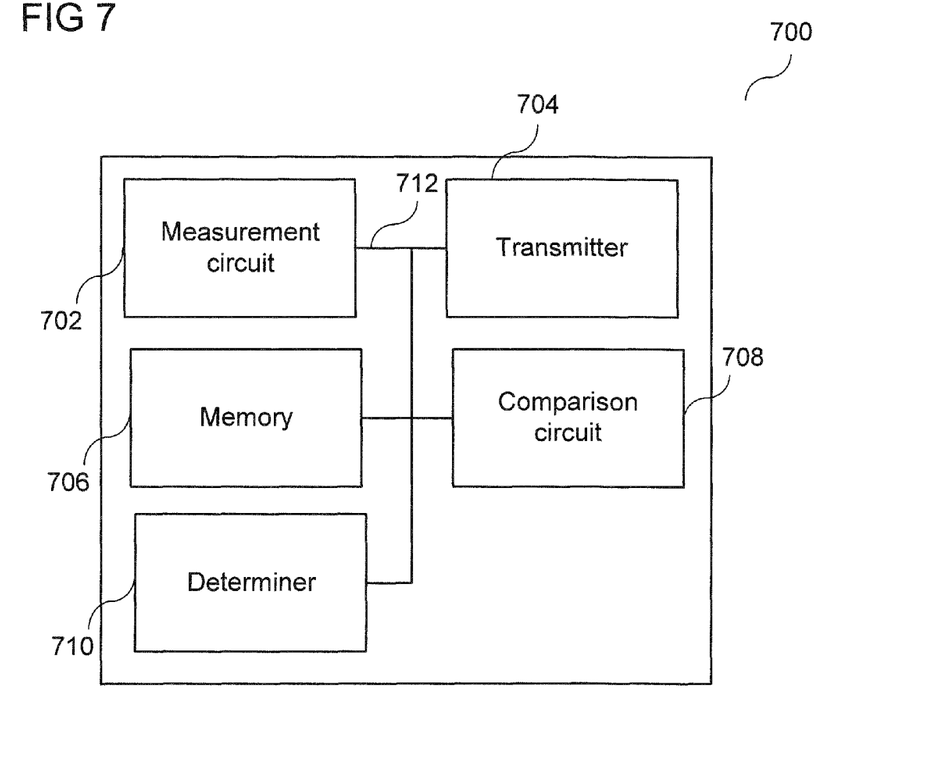
FIG. 7 shows a radio communication device for transmitting measurement reports.

FIG. 7 shows a radio communication device 700. The radio communication device 700 may include a measurement circuit 702 configured to measure a first reception quality of a first signal from another radio communication device (not shown) and configured to measure a second reception quality of a second signal from the other radio communication device. The radio communication device 700 may further include a transmitter 704 configured to transmit information related to the measured first reception quality to the other radio communication device. The radio communication device 700 may further include a memory 706 configured to store information related to the transmitted information. The radio communication device 700 may further include a comparison circuit 708 configured to compare information related to the measured second reception quality with the stored information. The radio communication device 700 may further include a determiner 710 configured to determine a quality of the (previously) transmitted information based on the comparison by the comparison circuit. The transmitter 704 may further transmit to the other radio communication device information indicating the determined quality of the (previously) transmitted information. The measurement circuit 702, the transmitter 704, the memory 706, the comparison circuit 708, and the determiner 710 may be coupled with each other, for example via a connection 712, for example an optical connection or an electrical connection, such as for example a cable or a computer bus or via any other suitable electrical connection to exchange electrical signals. The quality of the previously transmitted information may indicate as to whether the previously transmitted information is valid or not.

The radio communication device 700 may include or may be a mobile radio communication terminal.

The transmitted information may include or may be PUCCH 2-1 CSI reporting.

The measurement circuit 702 may measure the first reception quality based on a measurement on a wideband.

The measurement circuit 702 may measure the second reception quality based on a measurement on a band part, the band part having a bandwidth smaller than the wideband.

The measurement circuit 702 may measure the first reception quality based on a wideband measurement, and may measure the second reception quality based on a band part measurement, the band part having a bandwidth smaller than the wideband. The measurement circuit 702 may further measure a third reception quality of a third signal from the other radio communication device based on a band part measurement. The transmitter 704 may transmit first information related to the measured first reception quality to the other radio communication device and may transmit second information related to the measured second reception quality to the other radio communication device, and, optionally may transmit third information related to the measured third reception quality of a third signal from the other radio communication device. The memory 706 may store first information related to the transmitted first information and may store second information related to the transmitted second information. The comparison circuit 708 may compare information related to the measured third reception quality with the stored first information and the stored second information. The determiner 710 may determine which one of the stored first information and the stored second information is closer to the measured third reception quality.

The transmitter 704 may further transmit to the other radio communication device information indicating that the quality of the transmitted first information is higher than the quality of the transmitted second information, if the determiner determines that the stored first information is closer to the measured third reception quality.

The transmitter 704 may further transmit to the other radio communication device information indicating that the quality of the transmitted second information is higher than the quality of the transmitted first information, if the determiner determines that the stored second information is closer to the measured third reception quality.

Figure 8:
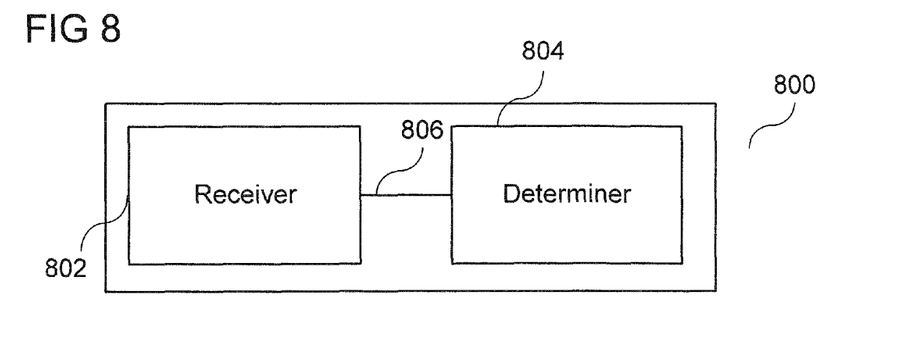
FIG. 8 shows a radio communication device for receiving measurement reports.

FIG. 8 shows a radio communication device 800. The radio communication device 800 may include a receiver 802 configured to receive from another radio communication device first information related to a measured first reception quality of a signal from the radio communication device to the other radio communication device and configured to receive from the other radio communication device second information indicating a quality of the first information. The radio communication device 800 may further include a determiner 804 configured to determine whether to use the first information based on the second information. The receiver 802 and the determiner 804 may be coupled with each other, for example via a connection 806, for example an optical connection or an electrical connection, such as for example a cable or a computer bus or via any other suitable electrical connection to exchange electrical signals.

The radio communication device 800 may include or may be a mobile radio base station.

The received information may include or may be PUCCH 2-1 CSI reporting.

The radio communication device 800 may further include a measurement mode change request circuit (not shown) configured to send a request to the other radio communication device if the determiner determines not to use the first information.

The receiver 802 may further receive from the other radio communication device third information related to a measured second reception quality of a signal from the radio communication device to the other radio communication device.

The first reception quality may be based on a measurement on a wideband.

The second reception quality may be based on a measurement on a band part, the band part having a bandwidth smaller than the wideband.

The receiver may further receive from the other radio communication device information indicating which of the quality of the received first information and the received third information is higher.

Figure 9:
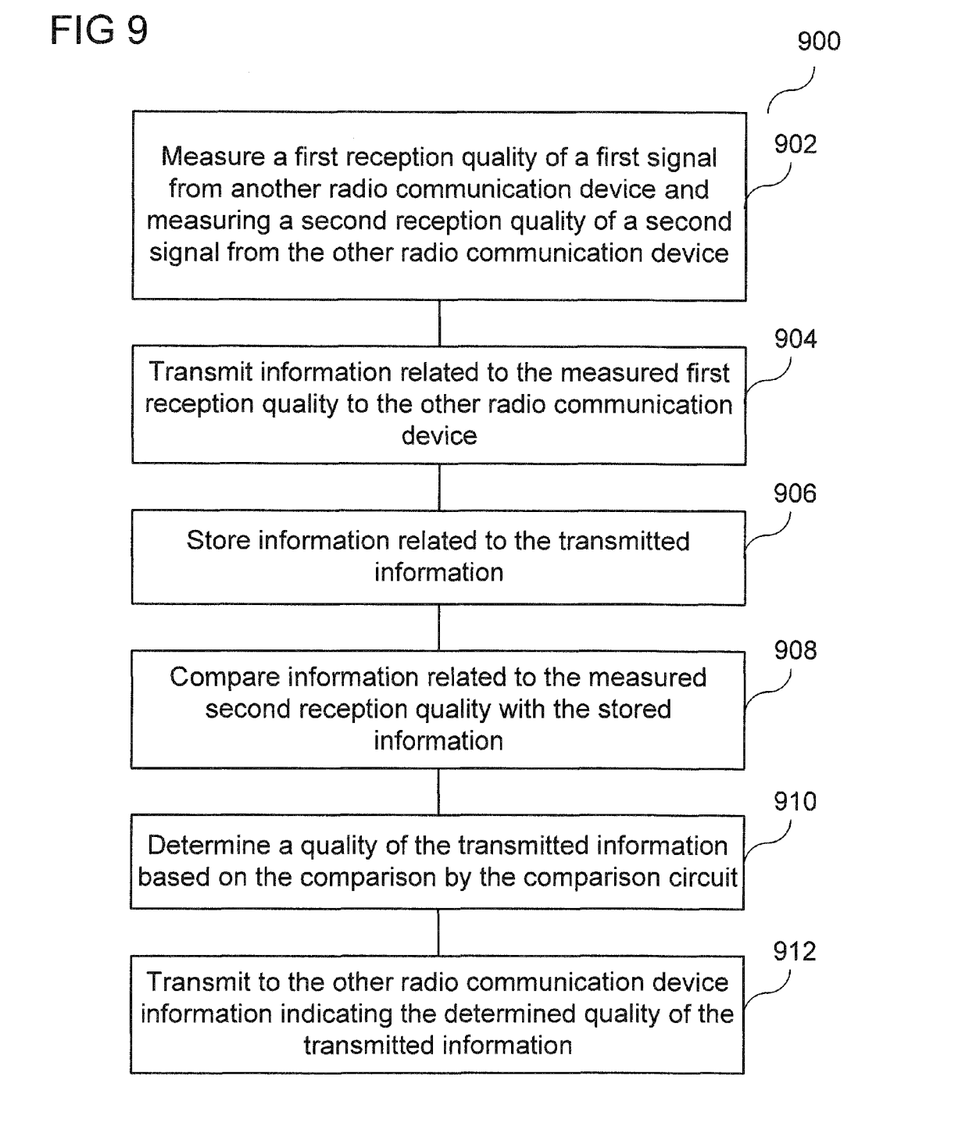
FIG. 9 shows a flow diagram illustrating a method for controlling a radio communication device for transmitting measurement reports.

FIG. 9 shows a flow diagram 900 illustrating a method for controlling a radio communication device. In 902, a measurement circuit of the radio communication device may measure a first reception quality of a first signal from another radio communication device and may measure a second reception quality of a second signal from the other radio communication device. In 904, a transmitter of the radio communication device may transmit information related to the measured first reception quality to the other radio communication device. In 906, a memory of the radio communication device may store information related to the transmitted information. In 908, a comparison circuit of the radio communication device may compare information related to the measured second reception quality with the stored information. In 910, a determiner of the radio communication device may determine a quality of the transmitted information based on the comparison by the comparison circuit. In 912, the transmitter of the radio communication device may transmit to the other radio communication device information indicating the determined quality of the transmitted information.

The radio communication device may include or may be a mobile radio communication terminal.

The transmitted information may include or may be PUCCH 2-1 CSI reporting.

The radio communication device may carry out base measuring of the first reception quality on a measurement on a wideband.

The radio communication device may carry out base measuring of the second reception quality on a measurement on a band part, the band part having a bandwidth smaller than the wideband.

The method may further include measuring the first reception quality based on a measurement on a wideband, and measuring the second reception quality based on a band part, the bandpart having a bandwidth smaller than the wideband; measuring a third reception quality of a third signal from the other radio communication device based on the band part; transmitting first information related to the measured first reception quality to the other radio communication device and transmitting second information related to the measured second reception quality to the other radio communication device; storing first information related to the transmitted first information and storing second information related to the transmitted second information; comparing information related to the measured third reception quality with the stored first information and the stored second information; and determining which one of the stored first information and the stored second information is closer to the measured third reception quality.

The method may further include transmitting to the other radio communication device information indicating that the quality of the transmitted first information is higher than the quality of the transmitted second information, if the determiner determines that the stored first information is closer to the measured third reception quality.

The method may further include transmitting to the other radio communication device information indicating that the quality of the transmitted second information is higher than the quality of the transmitted first information, if the determiner determines that the stored second information is closer to the measured third reception quality.

Figure 10:
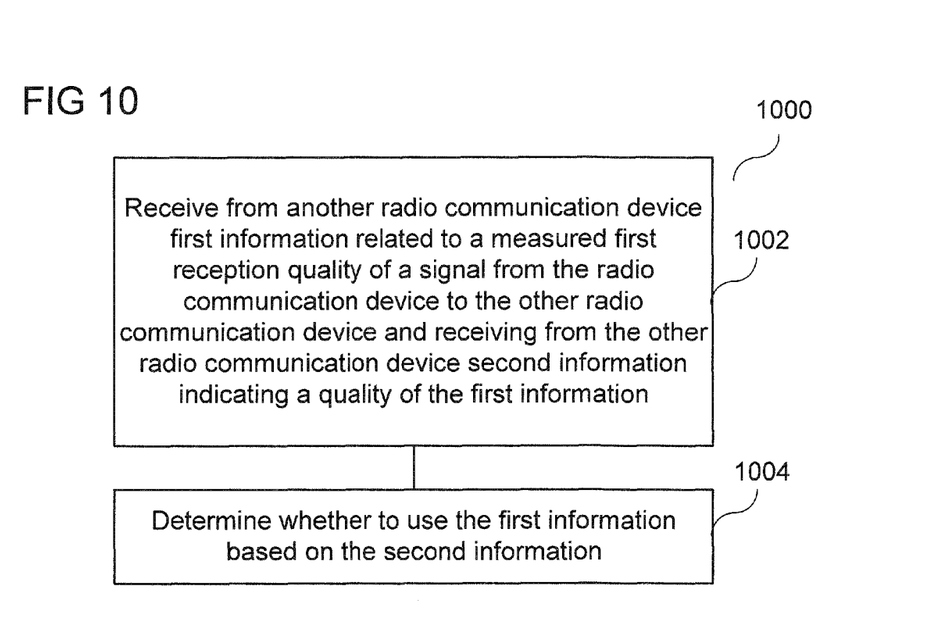
FIG. 10 shows a flow diagram illustrating a method for controlling a radio communication device for receiving measurement reports.

FIG. 10 shows a flow diagram 1000 illustrating a method for controlling a radio communication device. In 1002, a receiver of the radio communication device may receive from another radio communication device first information related to a measured first reception quality of a signal from the radio communication device to the other radio communication device and may receive from the other radio communication device second information indicating a quality of the first information. In 1004, a determiner of the radio communication device may determine whether to use the first information based on the second information.

The radio communication device may include or may be a mobile radio base station.

The received information may include or may be PUCCH 2-1 CSI reporting.

The method may further include sending a request to the other radio communication device if the determiner determines not to use the first information.

The method may further include receiving from the other radio communication device third information related to a measured second reception quality of a signal from the radio communication device to the other radio communication device.

The radio communication device may base the first reception quality on a measurement on a wideband.

The radio communication device may base the second reception quality on a measurement on a band part, the band part having a bandwidth smaller than the wideband.

The method may further include receiving from the other radio communication device information indicating which of the quality of the received first information and the received third information is higher.

Figure 11:
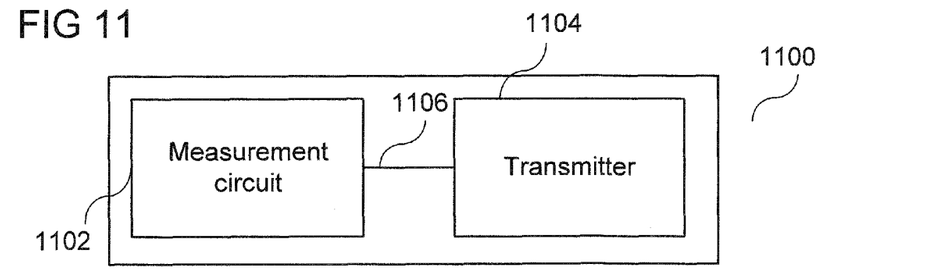
FIG. 11 shows a radio communication device with a measurement circuit and a transmitter.

FIG. 11 shows a radio communication device 1100. The radio communication device 1100 may include a measurement circuit 1102 configured to measure a first reception quality of a first signal from another radio communication device (not shown) and configured to measure a second reception quality of a second signal from the other radio communication device. The radio communication device 1100 may further include a transmitter 1104 configured to transmit information related to the measured first reception quality to the other radio communication device and configured to transmit to the other radio communication device information indicating a quality of the transmitted information, the quality determined based on a comparison of information related to the measured second reception quality with the information related to the transmitted information. The measurement circuit 1102 and the transmitter 1104 may be coupled with each other, for example via a connection 1106, for example an optical connection or an electrical connection, such as for example a cable or a computer bus or via any other suitable electrical connection to exchange electrical signals.

The radio communication device 1100 may include or may be a mobile radio communication terminal.

The measurement circuit 1102 may measure the first reception quality based on a measurement on a wideband.

Figure 12:
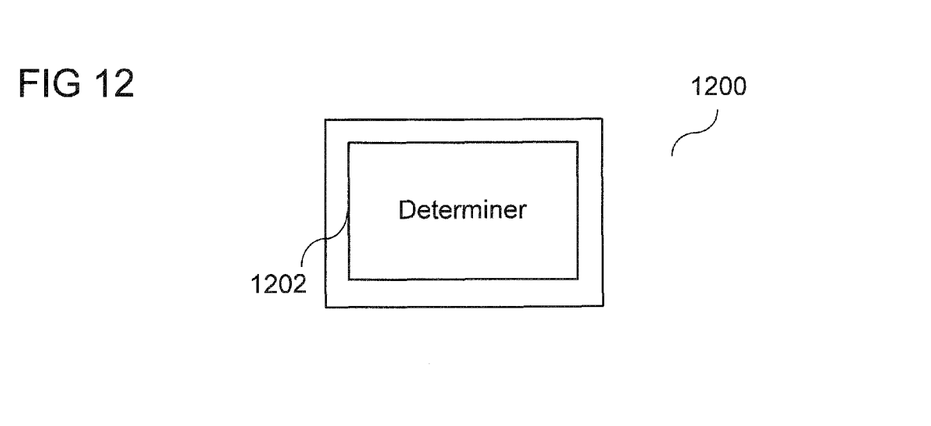
FIG. 12 shows a radio communication device with a determiner.

FIG. 12 shows a radio communication device 1200. The radio communication device 1200 may include a determiner 1202 configured to determine whether to use received first information related to a measured first reception quality of a signal from the radio communication device to another radio communication device (not shown) based on received second information indicating a quality of the first information.

The radio communication device may include or may be a mobile radio base station.

Figure 13:
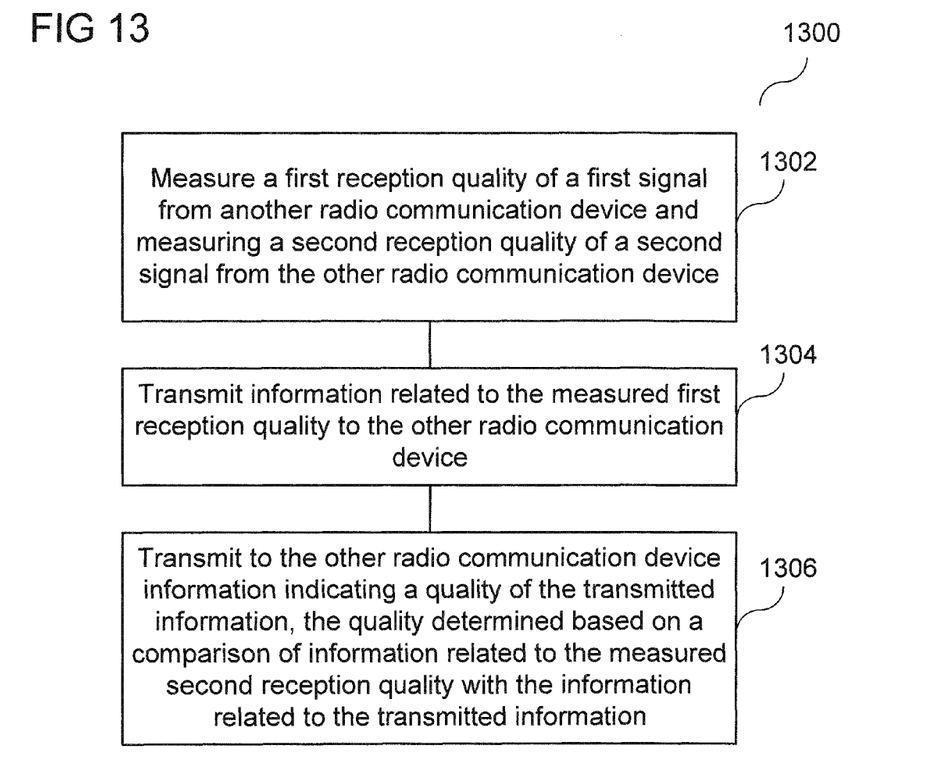
FIG. 13 shows a flow diagram illustrating a method for controlling a radio communication device with a measurement circuit and a transmitter.

FIG. 13 shows a flow diagram 1300 illustrating a method for controlling a radio communication device. In 1302, a measurement circuit of the radio communication device may measure a first reception quality of a first signal from another radio communication device and may measure a second reception quality of a second signal from the other radio communication device. In 1304, a transmitter of the radio communication device may transmit information related to the measured first reception quality to the other radio communication device. In 1306, the transmitter of the radio communication device may transmit to the other radio communication device information indicating a quality of the transmitted information, the quality determined based on a comparison of information related to the measured second reception quality with the information related to the transmitted information.

The radio communication device may include or may be a mobile radio communication terminal.

The measurement circuit may measure the first reception quality based on a measurement on a wideband.

Figure 14:
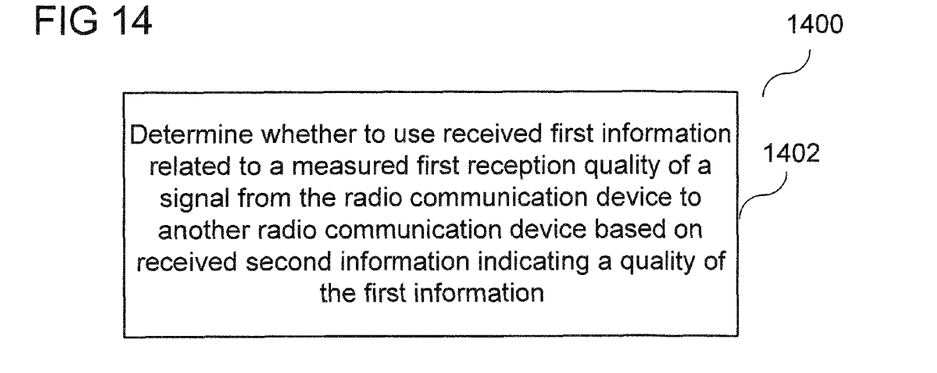
FIG. 14 shows a flow diagram illustrating a method for controlling a radio communication device with a determiner.

FIG. 14 shows a flow diagram 1400 illustrating a method for controlling a radio communication device. In 1402, a determiner of the radio communication device may determine whether to use received first information related to a measured first reception quality of a signal from the radio communication device to another radio communication device based on received second information indicating a quality of the first information.

The radio communication device may include or may be a mobile radio base station.

Any one of the radio communication devices described above may be a radio communication device configured according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard).

It is to be noted that the above described aspects are not limited to the reporting on CQI measurements or subband measurements, but may also be applied to any measurement and reporting scheme, e.g. measurements taken on the air interface between a UE and a base station (e.g. an eNodeB) and the reporting of the measurement results. By way example, the above aspects may be provided in the context of the measurement and signaling of second PMI (precoder matrix indicator) during wideband or subband reports in Transmission Mode 9 as described e.g. in ETSI TS 136 212 V 10.2.0.

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:
1. A radio communication device comprising:
a measurement circuit configured to measure a first reception quality of a first signal from another radio communication device in a first sub-band and configured to measure a second reception quality of a second signal from the other radio communication device in a second sub-band different from the first sub-band and config- ured to measure a third reception quality of a third signal from the other radio communication device in the first sub-band;
a transmitter configured to transmit first information related to the measured first reception quality;
a determiner configured to determine whether the first information related to the measured first reception quality is valid or invalid based on the measured third reception quality; and
the transmitter further configured to transmit to the other radio communication device second information related to the measured second reception quality and third information indicating the determined validity or invalidity of the first information related to the measured first reception quality.

2. The radio communication device of claim 1, wherein the measurement circuit is configured to measure the first, second, and third reception qualities conditioned on a wideband measurement.

3. The radio communication device of claim 2, wherein the wideband covers the first and second sub-bands.

4. A radio communication device comprising:
a receiver configured to receive from another radio communication device first information related to a measured first reception quality of a first signal from the radio communication device to the other radio communication device in a first sub-band and configured to receive from the other radio communication device second information related to a measured second reception quality of a second signal from the radio communication device to the other radio communication device in a second sub-band different from the first sub-band;
wherein the receiver is further configured to receive from the other radio communication device, and the second information related to the measured second reception quality, third information indicating whether the first information related to the measured first reception quality is valid or invalid; and
a determiner configured to determine whether to use the first information based on the third information.

5. The radio communication device of claim 4, wherein the first and second reception quality are conditioned on a wideband measurement.

6. The radio communication device of claim 5, wherein the wideband covers the first and second sub-bands.

7. A method for controlling a radio communication device, the method comprising:
measuring a first reception quality of a first signal from another radio communication device in a first sub-band and measuring a second reception quality of a second signal from the other radio communication device in a second sub-band different from the first sub-band and measuring a third reception quality of a third signal from the other radio communication device in the first sub-band;
transmitting first information related to the measured first reception quality to the other radio communication device;
determining whether the first information related to the measured first reception quality is valid or invalid based on the measured third reception quality; and
transmitting to the other radio communication device second information related to the measured second reception quality and third information indicating the determined validity or invalidity of the first information related to the measured first reception quality.

8. The method of claim 7, wherein measuring of the first, second and third reception quality is conditioned on a wideband measurement.

9. The method of claim 8, wherein the wideband covers the first sub-band and the second sub-band.

10. A method for controlling a radio communication device, the method comprising:
receiving from another radio communication device first information related to a measured first reception quality of a first signal from the radio communication device to the other radio communication device in a first sub-band and receiving from the other radio communication device second information related to a measured second reception quality of a second signal from the radio communication device to the other radio communication device in a second sub-band different from the second sub-band;
receiving from the other radio communication device the second information related to the measured second reception quality and third information indicating whether the first information related to the measured first reception quality is valid or invalid; and
determining whether to use the first information based on the third information.

11. The method of claim 10, further comprising:
the first, second and third reception qualities are conditioned on a wideband measurement.

12. The method of claim 11, wherein the wideband covers the first sub-band and the second sub-band.

13. A radio communication device comprising:
a measurement circuit configured to measure a first reception quality of a first signal from another radio communication device in a first sub-band and configured to measure a second reception quality of a second signal from the other radio communication device in a second sub-band different from the first sub-band and configured to measure a third reception quality of a third signal from the other radio communication device in the first sub-band; and
a transmitter configured to transmit first information related to the measured first reception quality to the other radio communication device and configured to transmit second information related to the measured second reception quality to the other radio communication device and third information indicating whether the first information related to the measured first reception quality is valid or invalid based on the measured third reception quality, the third information being based on the measured third reception quality.

14. The radio communication device of claim 13, the measurement circuit configured to measure the first, second and third reception qualities based on a wideband measurement.

* * * * *